United States Patent [19]
Witt

[11] Patent Number: 6,161,167
[45] Date of Patent: *Dec. 12, 2000

[54] FULLY ASSOCIATE CACHE EMPLOYING LRU GROUPS FOR CACHE REPLACEMENT AND MECHANISM FOR SELECTING AN LRU GROUP

[75] Inventor: David B. Witt, Austin, Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/884,435

[22] Filed: Jun. 27, 1997

[51] Int. Cl.[7] ............................................... G06F 12/12
[52] U.S. Cl. ..................... 711/136; 711/129; 711/134; 711/122
[58] Field of Search .................................. 711/122, 117, 711/120, 123, 131, 133, 136, 138, 144, 150, 151, 207, 139; 704/246

[56] References Cited

U.S. PATENT DOCUMENTS

| | | | |
|---|---|---|---|
| 3,693,165 | 9/1972 | Reiley et al. ............................ | 711/207 |
| 4,511,994 | 4/1985 | Webb et al. ............................. | 711/160 |
| 4,633,440 | 12/1986 | Pakulski .............................. | 365/189.05 |
| 4,654,778 | 3/1987 | Chiesa et al. .......................... | 711/151 |
| 4,907,278 | 3/1990 | Cecinati et al. ........................ | 704/246 |
| 5,241,663 | 8/1993 | Rohwer ................................. | 711/172 |
| 5,317,716 | 5/1994 | Liu . | |
| 5,325,504 | 6/1994 | Tipley et al. ........................... | 711/128 |
| 5,510,934 | 4/1996 | Brennan et al. . | |
| 5,551,001 | 8/1996 | Cohen et al. . | |
| 5,592,679 | 1/1997 | Yung . | |
| 5,644,752 | 7/1997 | Cohen et al. . | |
| 5,668,972 | 9/1997 | Liu et al. ............................... | 711/136 |
| 5,768,555 | 6/1998 | Tran et al. . | |
| 5,784,588 | 7/1998 | Leung . | |
| 5,802,338 | 9/1998 | Rechtschaffen et al. . | |
| 5,809,528 | 9/1998 | Miller et al. ........................... | 711/136 |

*Primary Examiner*—B. James Peikari
*Attorney, Agent, or Firm*—Conley, Rose & Tayon, PC; Lawrence J. Merkel

[57] ABSTRACT

A microprocessor employs an L0 cache. The L0 cache is located physically near the execute units of the microprocessor and is relatively small in size as compared to a larger L1 data cache included within the microprocessor. The L0 cache is accessed for those memory operations for which an address is being conveyed to a Load/store unit within the microprocessor during the clock cycle in which the memory operation is selected for access to the L1 data cache. The address corresponding to the memory operation is received by the L0 cache directly from the execute unit forming the address. If a hit in the L0 cache is detected, the L0 cache either forwards data or stores data corresponding to the memory operation (depending upon the type of the memory operation). The memory operation is conveyed to the L1 data cache in parallel with the memory operation accessing the L0 cache. If the memory operation misses in the L0 cache and hits in the L1 data cache, the cache line corresponding to the memory operation may be conveyed to the L0 cache as a line fill.

15 Claims, 6 Drawing Sheets

FULLY ASSOCIATE CACHE EMPLOYING LRU GROUPS FOR CACHE REPLACEMENT AND MECHANISM FOR SELECTING AN LRU GROUP

BACKGROUND OF THE INVENTION

1. Field of the Invention

This invention relates to the field of microprocessors and, more particularly, to caching mechanisms within microprocessors.

2. Description of the Related Art

Superscalar microprocessors achieve high performance by executing multiple instructions per clock cycle and by choosing the shortest possible clock cycle consistent with the design. On the other hand, superpipelined microprocessor designs divide instruction execution into a large number of subtasks which can be performed quickly, and assign pipeline stages to each subtask. By overlapping the execution of many instructions within the pipeline, superpipelined microprocessors attempt to achieve high performance. As used herein, the term "clock cycle" refers to an interval of time accorded to various stages of an instruction processing pipeline within the microprocessor. storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Superscalar microprocessors demand high memory bandwidth due to the number of instructions attempting concurrent execution and due to the increasing clock frequency (i.e. shortening clock cycle) employed by the superscalar microprocessors. Many of the instructions include memory operations to fetch (read) and update (write) memory operands. The memory operands must be fetched from or conveyed to memory, and each instruction must originally be fetched from memory as well. Similarly, superpipelined microprocessors demand high memory bandwidth because of the high clock frequency employed by these microprocessors and the attempt to begin execution of a new instruction each clock cycle. It is noted that a given microprocessor design may employ both superscalar and superpipelined techniques in an attempt to achieve the highest possible performance characteristics.

Microprocessors are often configured into computer systems which have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data then may be achieved from a disk storage, for example. However, the access times of modern DRAMs are significantly longer than the clock cycle length of modern microprocessors. The memory access time for each set of bytes being transferred to the microprocessor is therefore long. Accordingly, the main memory system is not a high bandwidth system. Microprocessor performance may suffer due to a lack of available memory bandwidth.

In order to allow high bandwidth memory access (thereby increasing the instruction execution efficiency and ultimately microprocessor performance), microprocessors typically employ one or more caches to store the most recently accessed data and instructions. A relatively small number of clock cycles may be required to access data stored in a cache, as opposed to a relatively larger number of clock cycles are required to access the main memory.

Unfortunately, the number of clock cycles required for cache access is increasing in modern microprocessors. Where previously a cache latency (i.e. the time from initiating an access to the corresponding data becoming available from the cache) might have been as low as one clock cycle, cache latencies in modern microprocessors may be two or even three clock cycles. A variety of delay sources are responsible for the increased cache latency. As transistor geometries characteristic of modern semiconductor fabrication technologies have decreased, interconnect delay has begun to dominate the delay experienced by circuitry upon on integrated circuit such as a microprocessor. Such interconnect delay may be particularly troubling within a large memory array such as a cache. Additionally, semiconductor fabrication technology improvements have enabled the inclusion of increasing numbers of functional units (e.g. units configured to execute at least a subset of the instructions within the instruction set employed by the microprocessor). While the added functional units increase the number of instructions which may be executed during a given clock cycle, the added functional units accordingly increase the bandwidth demands upon the data cache. Still further, the interconnect delay between the data cache and the functional units increases with the addition of more functional units (both in terms of length of the interconnect and in the capacitive load thereon). Another concept closely related to cache latency is referred to as the "load to use" penalty. Generally, the load to use penalty characteristic of a microprocessor is the number of clock cycles which elapse between the execution of a load memory operation and execution upon the referenced memory operand.

Instructions awaiting memory operands from the data cache are stalled throughout the cache latency period. Generally, an instruction operates upon operands specified by the instruction. An operand may be stored in a register (register operand) or a memory location (memory operand). Memory operands are specified via a corresponding address, and a memory operation is performed to retrieve or store the memory operand. Overall instruction throughput may be reduced due to the increasing cache latency experienced by these memory operations. The x86 microprocessor architecture is particularly susceptible to cache latency increase, since relatively few registers are available. Accordingly, many operands in x86 instruction code sequences are memory operands. Other microprocessor architectures are detrimentally affected as well.

SUMMARY OF THE INVENTION

The problems outlined above are in large part solved by a microprocessor employing an L0 cache. The L0 cache is located physically near the execute units of the microprocessor and is relatively small in size as compared to a larger L1 data cache included within the microprocessor. The smaller size and proximity to the execute units allow the L0 cache to achieve a reduced cache latency, and the microprocessor to achieve a reduced load to use penalty for those memory operands which hit in the L0 cache. Performance of the microprocessor may be increased due to the reduced cache latency for memory operands which hit in the L0 cache.

In addition to the cache latency reduction which may be achieved, a small L0 cache may be more easily multiported to allow for a larger number of concurrent accesses than may be achievable in a larger L1 cache. In many cases, it is not feasible to provide more than one or two ports to a typically-sized L1 cache. Area and timing constraints may be violated by attempting such a design. The L0 cache, on the other hand, may employ substantially more than 2 ports due to the size of the L0 cache. The size and timing constraints may be met even if many ports are added. Therefore, the L0 cache can provide for a large number of concurrent accesses and may achieve a reasonably high hit rate for the accesses. High memory bandwidth may thereby be provided to the microprocessor. The relatively fewer accesses which miss the L0 cache may then be handled by the L1 data cache, and the L1 data cache may be implemented with fewer ports.

According to one embodiment, the L0 cache is accessed for those memory operations for which an address is being conveyed to a load/store unit within the microprocessor during the clock cycle in which the memory operation is selected for access to the L1 data cache. The address corresponding to the memory operation is received by the L0 cache directly from the execute unit forming the address. If a hit in the L0 cache is detected, the L0 cache either forwards data or stores data corresponding to the memory operation (depending upon the type of the memory operation). The memory operation is conveyed to the L1 data cache in parallel with the memory operation accessing the L0 cache. If the memory operation misses in the L0 cache and hits in the L1 data cache, the cache line corresponding to the memory operation may be conveyed to the L0 cache as a line fill.

Broadly speaking, the present invention contemplates a microprocessor comprising a first execute unit, a load/store unit, a first cache, and a second cache. The first execute unit is configured to generate a first address corresponding to a first memory operand of a first instruction. Coupled to receive the first address from the first execute unit during a first clock cycle, the load/store unit comprises a queue for storing memory operations including a first memory operation corresponding to the first memory operand. The load/store unit is configured to select, during the first clock cycle, the first memory operation to perform a cache access. The load/store unit is configured to select the first memory operation responsive to a predetermined selection criteria. Coupled to receive the first address from the first execute unit during the first clock cycle, the first cache is configured to forward the first memory operand during the first clock cycle if the first memory operand hits in the first cache and the first memory operation is selected during the first clock cycle. Coupled to receive the first address from the load/store unit, the second cache is configured to forward the first memory operand during a second clock cycle subsequent to the first clock cycle if the first memory operand hits in the second cache.

The present invention further contemplates a method for accessing memory operands in a microprocessor. An address of a memory operand is conveyed from an execute unit to a load/store unit during a first clock cycle. The address is conveyed from the execute unit to a first cache during the first clock cycle. The memory operand is forwarded from the first cache during the first clock cycle if the memory operand hits in the first cache and if, during the first clock cycle, the load/store unit selects a memory operation corresponding to the memory operand for access to a second cache.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
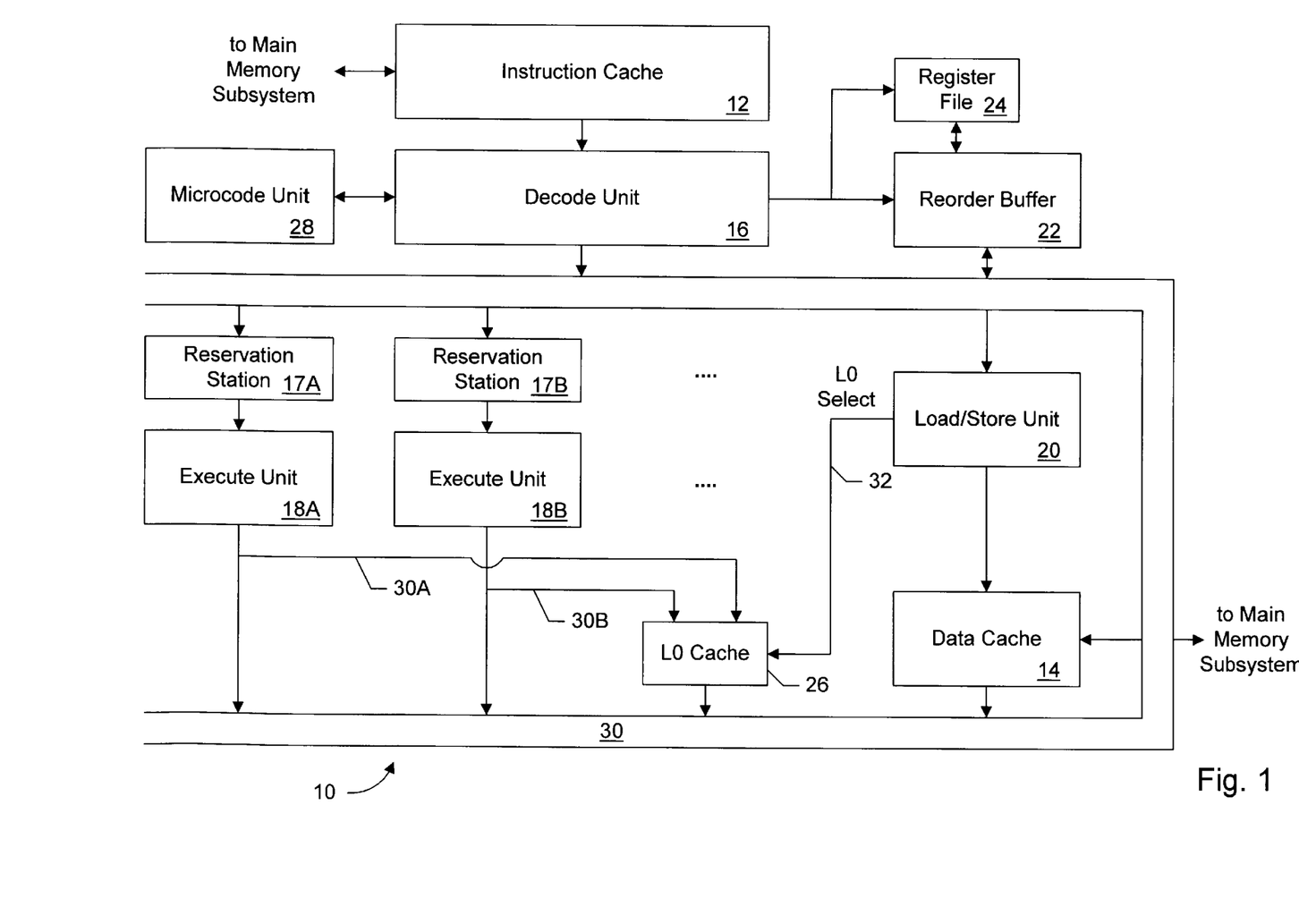
FIG. 1 is a block diagram of one embodiment of a microprocessor including a load/store unit and an L0 cache.

Turning now to FIG. 1, a block diagram of one embodiment of a microprocessor 10 is shown. Microprocessor 10 includes an instruction cache 12, a data cache 14, a decode unit 16, a plurality of reservation stations including reservation stations 17A and 17B, a plurality of execute units including execute units 18A and 18B, a load/store unit 20, a reorder buffer 22, a register file 24, an L0 cache 26, and a microcode unit 28. Elements referred to herein with a particular reference number followed by a letter will be collectively referred to by the reference number alone. For example, the plurality of execute units will be collectively referred to herein as execute units 18. Execute units 18 may include more execute units than execute units 18A and 18B shown in FIG. 1. Additionally, an embodiment of microprocessor 10 may include one execute unit 18.

As shown in FIG. 1, instruction cache 12 is coupled to a main memory subsystem (not shown) and to a decode unit 16, which is further coupled to reservation stations 17, load/store unit 20, reorder buffer 22, register file 24, and microcode unit 28. Reorder buffer 22, execute units 18, data cache 14, and L0 cache 26 are each coupled to a result bus 30 for forwarding of execution results. Furthermore, each reservation station 17A and 17B is coupled to a respective execute unit 18A and 18B, and to result buses 30 for receiving forwarded execution results. Each reservation station 17 is coupled to receive operand information from reorder buffer 22. Load/store unit 20 is coupled to L0 cache 26 and to data cache 14, which is further coupled to the main memory subsystem. Additionally, execute units 18 are connected to L0 cache 26. Finally, register file 24 is coupled to reorder buffer 22.

Generally speaking, microprocessor 10 includes an L0 cache 26 for providing load memory operation data or receiving store memory operation data during a clock cycle in which execute units 18 provide the address corresponding to the memory operation. L0 cache 26 is relatively small as compared to data cache 14. For example, L0 cache 26 may comprise between 32 and 64 cache line storage locations as compared to 1024 cache line storage locations in data cache 14, according to one embodiment. Other embodiments may include more or fewer cache line storage locations. Due to its relatively small size, L0 cache 26 may be physically located near execute units 18 upon a semiconductor substrate upon which microprocessor 10 is fabricated. Interconnect delay between L0 cache 26 and execute units 18 may thereby be lessened. Furthermore, the small size of L0 cache 26 engenders a relatively low cache latency. Advantageously, overall cache latency (and load to use penalties) may be reduced when a hit in L0 cache 26 is detected.

L0 cache 26 is directly coupled to result buses 30A and 30B from execute units 18A and 18B, respectively. Additionally, L0 cache 26 receives an L0 select bus 32 from load/store unit 20. Load/store unit 20 indicates which of result buses 30A and 30B (and other result buses corresponding to other execute units 18, not shown) are providing addresses which are concurrently being selected for access to data cache 14 via L0 select bus 32. L0 cache 26 selects addresses from the buses 30A and 30B to perform cache accesses to L0 cache 26 in response to L0 select bus 32. L0 cache 26 then forwards data in response to load memory operation hits or receives store data for store memory operation hits. Load/store unit 20 also provides the selected address to data cache 14, and data is provided in a subsequent clock cycle if a miss in L0 cache 26 is detected.

Instruction cache 12 is a high speed cache memory for storing instructions. It is noted that instruction cache 12 may be configured into a set-associative or direct mapped configuration. Instruction cache 12 may additionally include a branch prediction mechanism for predicting branch instructions as either taken or not taken. Instructions are fetched from instruction cache 12 and conveyed to decode unit 16 for decode and dispatch to a reservation station 17.

Decode unit 16 decodes each instruction fetched from instruction cache 12. Decode unit 16 dispatches the instruction to one or more of reservation stations 17 and/or to load/store unit 20 depending upon the type of instruction detected. More particularly, decode unit 16 produces a decoded instruction in response to each instruction fetched from instruction cache 12. The decoded instruction comprises control signals to be used by execute units 18 and/or load/store unit 20 to execute the instruction. For example, if a given instruction includes a memory operand, decode unit 16 may signal load/store unit 20 to perform a load/store (i.e. read/write) memory operation in response to the given instruction and may further signal execute units 18 to perform the operation defined for the instruction.

Decode unit 16 also detects the register operands used by the instruction and requests these operands from reorder buffer 22 and register file 24. In one embodiment, execute units 18 are symmetrical execution units. Symmetrical execution units are each configured to execute a particular subset of the instruction set employed by microprocessor 10. The subsets of the instruction set executed by each of the symmetrical execution units are the same. In another embodiment, execute units 18 are asymmetrical execution units configured to execute dissimilar instruction subsets. For example, execute units 18 may include a branch execute unit for executing branch instructions, one or more arithmetic/logic units for executing arithmetic and logical instructions, and one or more floating point units for executing floating point instructions. Decode unit 16 dispatches an instruction to a reservation station 17 which is coupled to an execute unit 18 or load/store unit 20 which is configured to execute that instruction.

Microcode unit 28 is included for handling instructions for which the architecturally defined operation is more complex than the hardware employed within execute units 18 and load/store unit 20 may handle. Microcode unit 28 parses the complex instruction into multiple instructions which execute units 18 and load/store unit 20 are capable of executing. Additionally, microcode unit 28 may perform functions employed by microprocessor 10. For example, microcode unit 28 may perform instructions which represent a context switch. Context switches may occur in response to an interrupt being signalled to microprocessor 10, for example.

Load/store unit 20 provides an interface between execute units 18 and data cache 14. Load and store memory operations are performed by load/store unit 20 to data cache 14. Additionally, memory dependencies between load and store memory operations are detected and handled by load/store unit 20. Generally speaking, a "memory operation" is performed to transfer data between the main memory and microprocessor 10. A load memory operation specifies the transfer of data from one or more memory locations within the main memory to microprocessor 10. On the other hand, a store memory operation specifies the transfer of data from microprocessor 10 to one or more memory locations within the main memory. The memory location or locations accessed by a given memory operation are identified within the main memory by an address corresponding to the given memory operation.

According to one embodiment, execute units 18 form the addresses for memory operations and convey those addresses to load/store unit 20. Load/store unit 20 receives the addresses and associates them with the corresponding memory operation stored therein. Additionally, load/store unit 20 selects memory operations for access to data cache 14. A predetermined selection criteria is used to select the memory operations which are allowed to access data cache 14. According to one particular embodiment, memory operations are selected for access to data cache 14 in program order with the following priority (1 being the highest):

1) stores that are no longer speculative;
2) loads that are misses and are no longer speculative;
3) loads that are speculative and have not yet accessed the cache.

Load/store unit 20 may operate in a non-blocking fashion, whereby a miss detected for a prior memory operation does not prohibit a subsequent memory operation from being selected for cache access.

If a memory operation is selected to access data cache 14 during a clock cycle in which the corresponding address is being provided from an execute unit 18, L0 cache 26 is accessed. L0 cache 26 provides forwarded data and a hit indication during the clock cycle if a hit is detected. L0 cache 26, being smaller in size that data cache 14 and located physically close to execute units 18 and reservation stations 17, may provide the requested data (or receive the data, in the case of a store memory operation) within the same clock cycle. If a miss of a load memory operation is detected in L0 cache 26, L0 cache 26 may perform a line fill operation during the subsequent clock cycle in which a hit is detected in data cache 14.

Reservation stations 17 are configured to store instructions whose operands have not yet been provided. An instruction is selected from those stored in a reservation station 17A–17B for execution if: (1) the operands of the instruction have been provided, and (2) the instructions within the reservation station 17A–17B which are prior to the instruction being selected in program order have not yet received operands. It is noted that a centralized reservation station may be included instead of separate reservations stations. The centralized reservation station is coupled between decode unit 16, execute units 18, and load/store unit 20. Such an embodiment may perform the dispatch function within the centralized reservation station.

Microprocessor 10 supports out of order execution, and employs reorder buffer 22 for storing execution results of speculatively executed instructions and storing these results into register file 24 in program order, for performing dependency checking and register renaming, and for providing for mispredicted branch and exception recovery. When an instruction is decoded by decode unit 16, requests for register operands are conveyed to reorder buffer 22 and register file 24. In response to the register operand requests, one of three values is transferred to the reservation station 17A–17B which receives the instruction: (1) the value stored in reorder buffer 22, if the value has been speculatively generated; (2) a tag identifying a location within reorder buffer 22 which will store the result, if the value has not been speculatively generated; or (3) the value stored in the register within register file 24, if no instructions within reorder buffer 22 modify the register. Additionally, a storage location within reorder buffer 22 is allocated for storing the results of the instruction being decoded by decode unit 16. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 18 or load/store unit 20 execute an instruction, the tag assigned to the instruction by reorder buffer 22 is conveyed upon result bus 30 along with the result of the instruction. Reorder buffer 22 stores the result in the indicated storage location. Additionally, reservation stations 17 compare the tags conveyed upon result bus 30 with tags of operands for instructions stored therein. If a match occurs, the unit captures the result from result bus 30 and stores it with the corresponding instruction. In this manner, an instruction may receive the operands it is intended to operate upon. Capturing results from result bus 30 for use by instructions is referred to as "result forwarding".

Instruction results are stored into register file 24 by reorder buffer 22 in program order. Storing the results of an instruction and deleting the instruction from reorder buffer 22 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 22 discards the instructions subsequent to the mispredicted branch instructions. Instructions thus discarded are also flushed from reservation stations 17, execute units 18, load/store unit 20, and decode unit 16.

Register file 24 includes storage locations for each register defined by the microprocessor architecture employed by microprocessor 10. For example, microprocessor 10 may employ the x86 microprocessor architecture. For such an embodiment, register file 24 includes locations for storing the EAX, EBX, ECX, EDX, ESI, EDI, ESP, and EBP register values.

Data cache 14 is a high speed cache memory configured to store data to be operated upon by microprocessor 10. It is noted that data cache 14 may be configured into a set-associative or direct-mapped configuration. Data cache 14 allocates and deallocates storage for data in cache lines. A cache line is a block of contiguous bytes. The byte within the cache line which has the lowest numerical address is stored at an address which is aligned to a cache line boundary.

Generally, a cache receives an access and determines if a cache line corresponding to the address is stored in the cache (a hit) or not stored in the cache (a miss). A cache may be structured in many different fashions. Popular structures include direct-mapped, set associative, and fully associative. In a direct-mapped structure, one cache line storage location within the cache is selected when a given address is presented. A portion of the address is used as an index to select the cache line storage location. A set associative cache is a two dimensional array of storage locations. A given address selects a row of the cache (via a predetermined set of index bits), and each column is a cache line storage location. Any one of the cache line storage locations within the row may be used to store a cache line corresponding to the given address. In a fully associative structure, any cache line storage location may be used to store a cache line corresponding to any address. A compare between the addresses corresponding to each of the cache lines and the given address is performed to detect a hit or miss.

In order to detect hits or misses with respect to a given address, the cache stores a cache tag corresponding to each cache line. The cache tag includes at least a portion of the address corresponding to the cache line. The portion of the address stored is sufficient to identify the cache line given selection of the cache line for comparison. For example, the bits of the address which define an offset within the cache line need not be stored. Additionally, bits of the address which form the index for the cache need not be stored for those cache structures which use an index. Additionally, the cache tag stores the state of the line (e.g. whether or not the cache line storage location is storing a valid cache line). The state may additionally indicate the ownership of the cache line and its dirty/clean state with respect to the copy of the cache line stored in main memory. Finally, the tag may include information regarding which cache line should be selected for replacement when a cache miss is detected.

Generally, when a cache miss is detected, the corresponding cache line is read from main memory and placed into the cache (a "line fill" operation). Placing the missing line into the cache may displace a cache line currently stored therein. Direct-mapped caches, which have only one storage location which may store a given address, do not use any replacement algorithm. However, in set associative and fully associative caches in which multiple cache line storage locations are eligible for storing a cache line corresponding to a given address, a replacement algorithm is employed. For example, a least recently used (LRU) algorithm may be employed. Replacement data stored with each cache line ranks the cache lines which are eligible for storing a given address according to the temporal relationship of accesses to the cache lines. When a cache line is accessed, the replacement data of the cache line and other cache lines eligible for storing the given address is updated such that the accessed cache line is indicated to be the most recently used. Each cache line formerly indicated to be more recently used than the accessed cache line is updated to one position lower (i.e. closer to the least recently used) in the ranking. When a line fill operation is performed, the cache line indicated to be least recently used is selected for storing the cache line provided by the line fill operation.

The main memory subsystem effects communication between microprocessor 10 and devices coupled thereto. For example, instruction fetches which miss instruction cache 12 may be transferred from a main memory by the main memory subsystem. Similarly, data requests performed by load/store unit 20 which miss data cache 14 may be transferred from main memory by the main memory subsystem. Additionally, data cache 14 may discard a cache line of data which has been modified by microprocessor 10. The main memory subsystem transfers the modified line to the main memory.

It is noted that decode unit 16 may be configured to dispatch an instruction to more than one execution unit. For example, in embodiments of microprocessor 10 which employ the x86 microprocessor architecture, certain instructions may operate upon memory operands. Executing such an instruction involves transferring the memory operand from data cache 14, executing the instruction, and transferring the result to memory (if the destination operand is a memory location) or data cache 14. Load/store unit 20 performs the memory operations, and an execute unit 18 performs the execution of the instruction.

Figure 2:
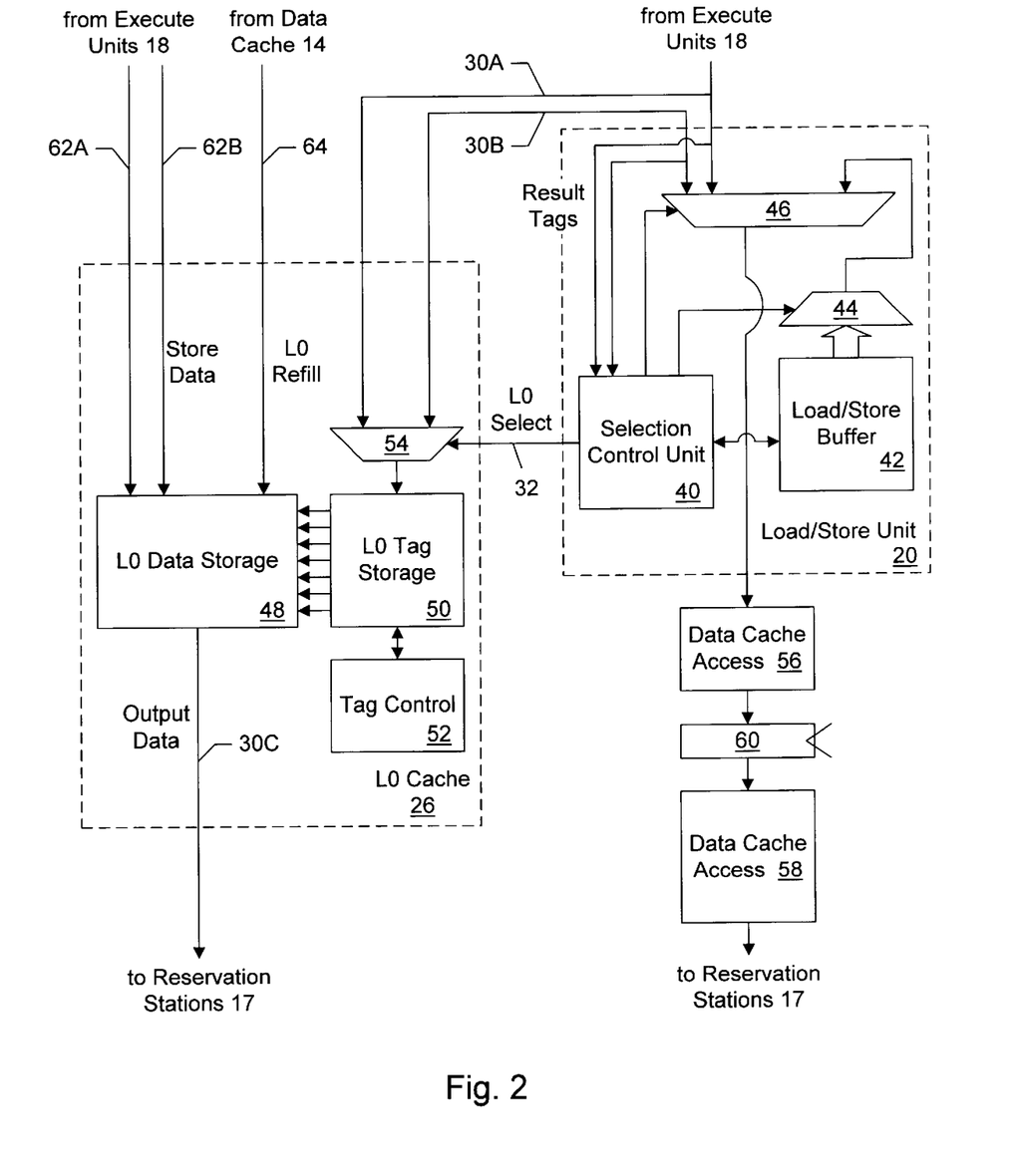
FIG. 2 is a block diagram of one embodiment of the L0 cache connected to one embodiment of the load/store unit shown in FIG. 1.

Turning next to FIG. 2, a block diagram of one embodiment of L0 cache 26 coupled to one embodiment of load/store unit 20 is shown. As shown in FIG. 2, load/store unit 20 includes a selection control unit 40, a load/store buffer 42, a first multiplexor 44, and a second multiplexor 46. L0 cache 26 includes an L0 data storage 48, an L0 tag storage 50, a tag control unit 52, and a multiplexor 54 as shown in FIG. 2. Additionally, FIG. 2 illustrates in conceptual form the cache access of data cache 14 via blocks 56 and 58 and register 60. It is noted that first multiplexor 44 and second multiplexor 46 of load/store unit 20 and multiplexor 54 of L0 cache 26 may actually be implemented as multiple multiplexors in cascade, parallel, or both, as long as the multiple multiplexors operate to perform the corresponding selection function.

Selection control unit 40 is coupled to provide selection controls to first multiplexor 44 and second multiplexor 46, as well as to L0 select bus 32 which is coupled to multiplexor 54. Additionally, selection control unit 40 is coupled to receive result tags corresponding to result buses 30A and 30B and to load/store buffer 42. First multiplexor 44 is coupled between load/store buffer 42 and second multiplexor 46. Second multiplexor 46 is further coupled to receive result buses 30A and 30B from execute units 18 and to provide input to data cache 14 (illustrated as a connection of the output of second multiplexor 46 to block 56). Multiplexor 54 receives result buses 30A and 30B as input and provides access addresses to L0 tag storage 50. L0 tag storage 50 is coupled to L0 data storage 48 and to tag control unit 52. L0 data storage 48 is coupled to an output data bus 30C which may form a portion of result buses 30. Additionally, L0 data storage 48 is coupled to receive store data from execute units 18 upon store data buses 62A and 62B. Still further, L0 data storage 48 is coupled to an L0 refill bus 64 from data cache 14.

Generally, selection control unit 40 is configured to select memory operations for access to data cache 14. Selection control unit 40 searches the memory operations stored in load/store buffer 42 and selects memory operations for access to data cache 14. Selection control unit 40 applies the predetermined selection criteria to the memory operations stored in load/store buffer 42. The predetermined selection criteria may, for example, be the criteria listed in the discussion of FIG. 1 above. A memory operation may not be selected for access until an execute unit 18 has provided an address for that memory operation. However, during a particular clock cycle, selection control unit 40 is configured to select a memory operation for which the address is being provided by execute units 18 during that particular clock cycle. Selection control unit 40 identifies those memory operations for which corresponding addresses are being provided from execute units 18 via the result tags provided upon result buses 30A and 30B. The address of a memory operation is selected, by second multiplexor 46 under control of selection control unit 40, either from load/store buffer 42 (if the address was provided during a previous clock cycle) or from result buses 30A and 30B (if the address is being provided concurrent with selection of the memory operation for access to data cache 14). Other attributes of the selected memory operation (such as its load/store nature, etc.) are provided from load/store buffer 42 via first multiplexor 44 and second multiplexor 46.

Selection control unit 40 is further configured to control the operation of multiplexor 54. During clock cycles in which selection control unit 40 selects an address being provided upon result buses 30A or 30B for access to data cache 14, selection control unit 40 asserts signals upon L0 select bus 32 which cause the address to be selected into L0 tag storage 50. Addresses provided upon result buses 30A or 30B which are not selected by selection control unit 40 during the clock cycle conveyed are inhibited from accessing L0 cache 26. L0 tag storage 50 compares the tags of cache lines stored within L0 cache 26 to the address selected by multiplexor 54 and selects a cache line storage location from L0 data storage 48 for transmitting data upon output data bus 30C, in the event a hit within L0 cache 26. L0 tag storage 50 may be implemented as a content addressable memory (CAM), for example. The comparators which are included as part of the CAM may be used to compare the addresses of the stored tags to the address selected by multiplexor 54. It is noted that output data bus 30C may be configured to transmit an amount of data smaller than a cache line. For example, cache lines may comprise 32 bytes and output data bus 30C may be configured to transmit 32 bits (4 bytes) of data containing the addressed byte. L0 data storage 48 may be configured to receive a portion of the address so as to select the portion of the cache line to forward. Alternatively, a multiplexor may be included to select the appropriate bytes out of the cache line. In yet another alternative, L0 cache 26 may be configured to store cache lines equal in size to the size of output data bus 30C.

Output data bus 30C transmits data to reservation stations 17 for load memory operations which hit L0 cache 26. Since L0 cache 26 is configured in close proximity to execute units 18 (and the corresponding reservation stations 17), output data bus 30C (and result buses 30A and 30B as routed to L0 cache 26) may be quite short in length. Interconnect delays between L0 cache 26, execute units 18, and reservation stations 17 may thereby be minimized.

Store data buses 62A and 62B are used to forward store data for store memory operations. If the corresponding store memory operation is selected via multiplexor 54 and the store memory operation hits L0 cache 26, the store data conveyed upon store data bus 62A or 62B is stored into the corresponding cache line storage location. Additionally, the store data is forwarded to load/store unit 20 for performing the store memory operation into data cache 14. In this manner, a cache line stored in L0 cache 26 and the corresponding cache line stored in data cache 14 are maintained coherent with each other. In other words, L0 cache 26 is maintained in a writethrough fashion to data cache 14. The updated cache line including the store data is therefore available for rapid access in L0 cache 26 without requiring the L0 cache 26 write discarded lines into data cache 14.

Tag control unit 52 updates the replacement data for the cache lines stored in L0 cache 26 upon detection of a hit, and assigns a cache line storage location for storing a cache line corresponding to an address which misses. According to one embodiment, L0 cache 26 comprises a fully associative cache. Tag control unit 52 may implement an LRU replacement algorithm among the cache line storage locations. Alternatively, tag control unit 52 may employ a modified LRU replacement algorithm as described below.

According to one embodiment, L0 cache 26 allocates a cache line storage location upon load memory operation misses. Store memory operation misses do not cause a cache line allocation. Instead, the store memory operation is performed to data cache 14 (and possibly to main memory if a miss in data cache 14 is detected or the address is defined to be writethrough). Additionally, L0 cache 26 may perform filtering to the load memory operation misses. For example, if the load memory operation corresponds to a floating point instruction or is part of a string move operation, the load memory operation may not cause a line fill into L0 cache 26. These types of accesses are often not associated with reuse of the accessed data. Therefore, allocating storage in L0 cache 26 for these types of misses may not lead to a significant increase in performance. Moreover, retaining the cache lines in L0 cache 26 which would be replaced by the filtered misses may lead to performance increases due to a better overall hit rate in L0 cache 26.

Data cache 14 provides the cache line for a line fill operation upon L0 refill bus 64. L0 data storage 48 stores the data into the cache line storage location allocated for the line fill. Generally, L0 cache 26 is maintained as a subset of data cache 14. In other words, each cache line stored in L0 cache 26 corresponds to a cache line stored in data cache 14. If data cache 14 discards a cache line which is also stored in L0 cache 26, the cache line is invalidated in L0 cache 26. The cache line may be discarded through normal cache line replacement in data cache 14 or due to a coherency operation performed upon data cache 14 (i.e. to maintain coherency between data cache 14 and other caches within a computer system including microprocessor 10). According to the embodiment shown in FIG. 2, L0 cache 26 is linearly addressed (i.e. the address generated by execute units 18 is a linear address, as defined by the x86 microprocessor architecture). The linear address is formed by adding the address operands of the instruction to a segment base address of a memory segment selected by the instruction. Alternatively, execute units 18 may generate the logical address (i.e. the sum of the address operands) and access L0 cache 26 with the logical address. The logical address is the same as the linear address if the segment base address is zero. In flat addressing mode (a common mode used with x86-style processors), the segment base address is zero. If flat addressing mode is not used, load/store unit 20 may add the segment base address.

As mentioned above, a memory operation is concurrently selected for access to L0 cache 26 and data cache 14. Data cache 14, as illustrated in FIG. 2, begins a cache access during the clock cycle in which the address is selected. However, as illustrated via register 60 and block 58, data cache 14 does not complete its access and forward data until the succeeding clock cycle. Data cache 14 is substantially larger than L0 cache 26 and is physically located far from execute units 18. Therefore, cache latency is larger for data cache 14 than for L0 cache 26. Interconnection delays between data cache 14, execute units 18, and reservation stations 17 contribute to the higher cache latency. Additionally, the size of data cache 14 increases cache latency through increased internal delays among the larger structures. In other embodiments, access to data cache 14 may be performed only during the succeeding clock cycle. The clock cycle in which addresses are selected is used to convey addresses to data cache 14.

According to one embodiment, load/store buffer 42 comprises a queue for storing load and store memory operations. The queue may intermix load and store memory operations according to the program order of the memory operations.

It is noted that the above discussion describes selecting an address for access to L0 cache 26 and data cache 14. However, L0 cache 26 and data cache 14 may be configured to perform multiple accesses concurrently. Generally, the number of addresses which may concurrently access L0 cache 26 may be equal to the number of addresses which may concurrently access data cache 14. Alternatively, the number of addresses which may concurrently access L0 cache 26 may be fewer or greater than the number of addresses which may concurrently access data cache 14. It is further noted that L0 cache 26 may or may not implement cache lines which are the same size as cache lines in data cache 14. More particularly, L0 cache 26 may implement cache lines which are shorter than data cache 14.

Figure 3:
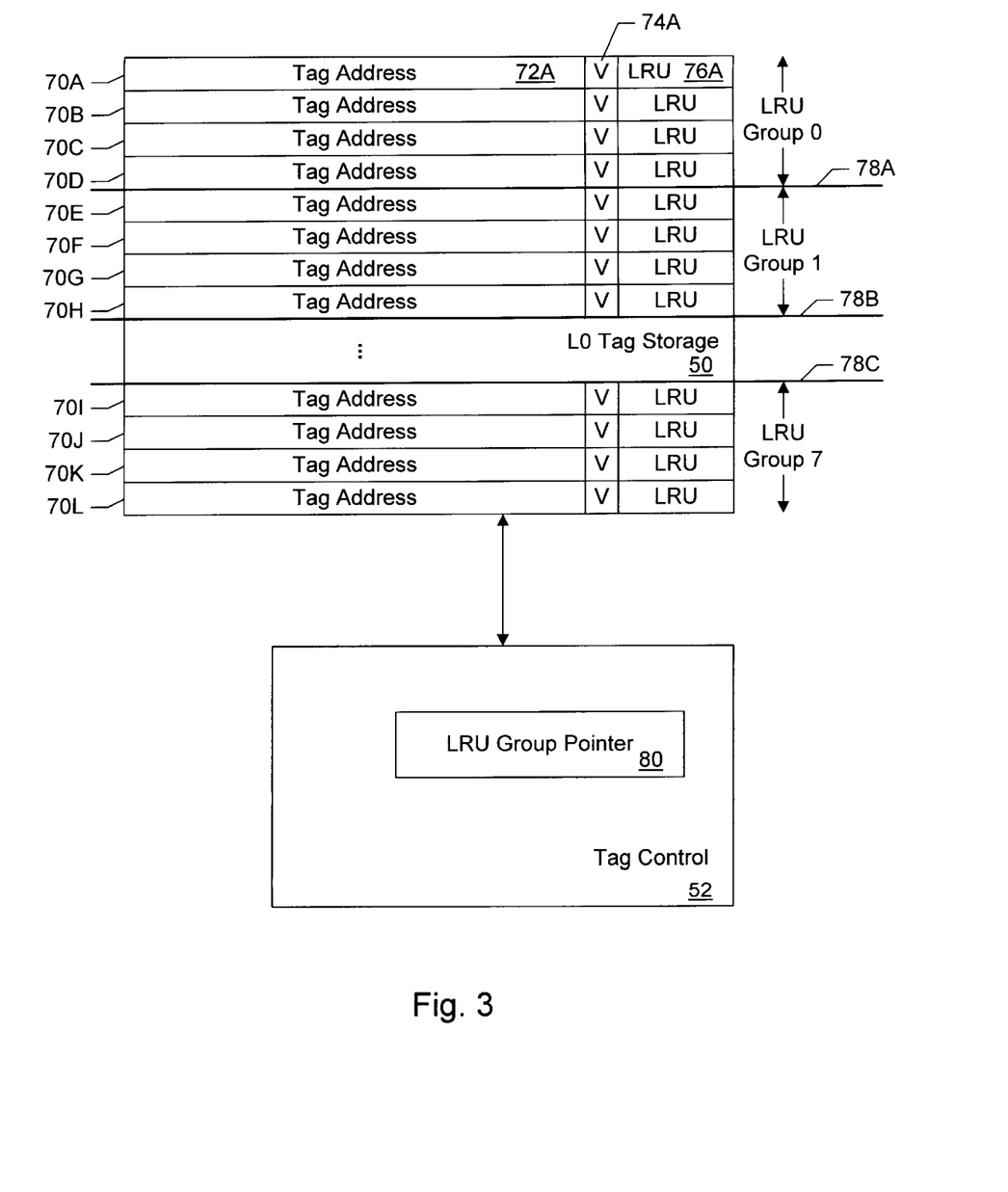
FIG. 3 is a block diagram of one embodiment of a tag storage and one embodiment of a tag control unit shown in FIG. 2.

Turning next to FIG. 3, a block diagram illustrating one embodiment of L0 tag storage 50 and one embodiment of tag control unit 52 in greater detail is shown. As illustrated in FIG. 3, L0 tag storage 50 comprises multiple tag storage locations including tag storage locations 70A–70L. Each tag storage location 70 includes a tag address field, a valid bit, and an LRU field. For example, tag storage location 70A includes a tag address field 72A, a valid bit 74A, and an LRU field 76A. The tag address field stores the tag address of the corresponding cache line and the valid bit indicates the validity of the cache line. For example, if microprocessor 10 employs 32 bit address and 32 byte cache lines, the tag address field may comprise the most significant 27 bits of the address corresponding to the cache line.

The LRU field of each tag storage location 70 stores LRU data, in accordance with the replacement algorithm employed by tag control unit 52. According to the embodiment shown in FIG. 3, a modified LRU scheme is employed as the replacement algorithm for L0 cache 26. Tag control unit 52 logically divides the tag storage locations 70 into groups. For example, eight groups of four tag storage locations are represented in FIG. 3. Such a division may be employed if L0 tag storage 50 includes 32 tag storage locations 70. The groups of tag storage locations are illustrated via heavy horizontal lines 78A, 78B and 78C. For example, LRU group 0 comprises tag storage locations 70A, 70B, 70C, and 70D. Similarly, LRU group 1 comprises tag storage locations 70E, 70F, 70G, and 70H. Additional LRU groups are defined for other tag storage locations 70, up through LRU group 7 which includes tag storage locations 70I, 70J, 70K, and 70L.

The LRU field of each tag storage location 70 indicates the temporal relationship between accesses to the cache line corresponding to that tag storage location 70 and accesses to the cache lines corresponding to other tag storage locations 70 within the same LRU group as that tag storage location 70. For example, LRU field 76A of tag storage location 70A indicates the temporal relationship between accesses to the cache line identified by tag address field 72A and the cache lines identified by tag storage locations 70B, 70C, and 70D. Since the number of tag storage locations within an LRU group is small, the logic for updating the LRU fields upon access to one of the cache lines represented within an LRU group may be simplified. Therefore, updating the LRU data may be performed rapidly. For example, the LRU fields may comprise 2 bits according to the embodiment of FIG. 3. The binary value "00" may comprise the least recently used of the entries within the LRU group. Similarly, the binary value "01" may comprise the second least recently used of the entries within the group; the binary value "10" may comprise the third least recently used of the entries within the group; and the binary value "11" may comprise the most recently used of the entries within the group.

Upon access to a cache line within a particular LRU group, the LRU fields of the group are updated such that the accessed cache line is indicated to be the most recently used. The LRU field corresponding to the cache line formerly indicated to be most recently used is updated to be third least recently used; etc.

Upon detection of a cache miss for a load memory operation, tag control unit 52 selects one of tag storage locations 70 for storing the missing cache line. The cache line currently stored in the selected tag storage location 70 is discarded, and is referred to as the "victim". Tag control unit 52 selects an LRU group from which to select the tag storage location, and then selects the tag storage location within the selected LRU group which is storing the least recently used cache line within the group. According to the embodiment shown in FIG. 3, tag control unit 52 selects the LRU group via an LRU group pointer register 80. LRU Group pointer register 80 stores a value indicating which of the LRU groups should be selected from which to select the victim tag storage location 70. After using the value in LRU group pointer register 80, tag control unit 52 increments the value such that the value points to a different LRU group. In this manner, the LRU groups are used in a round-robin manner for successive cache line replacements. In a round-robin selection mechanism, each of the items being selected is selected once before selecting any of the items for a second time.

While selecting LRU groups in a round-robin fashion and selecting the least recently used cache line within the selected LRU group for replacement does not exactly imitate a true LRU implementation, the logic circuitry employed to maintain LRU within the groups and the logic circuitry employed to maintain the round-robin may be significantly smaller and less cumbersome than the logic to maintain true LRU over all the entries. The decrease in complexity may lead to an increase in speed of operation of L0 cache 26. Since L0 cache 26 is intended to provide data in the same cycle as the address is conveyed even at high frequencies, increase the operational speed at the expense of implementing true LRU may be appropriate.

As an alternative to maintaining LRU group pointer register 80 and performing round-robin selection among the LRU groups, tag control unit 52 may perform random selection among the LRU groups.

Figure 4:
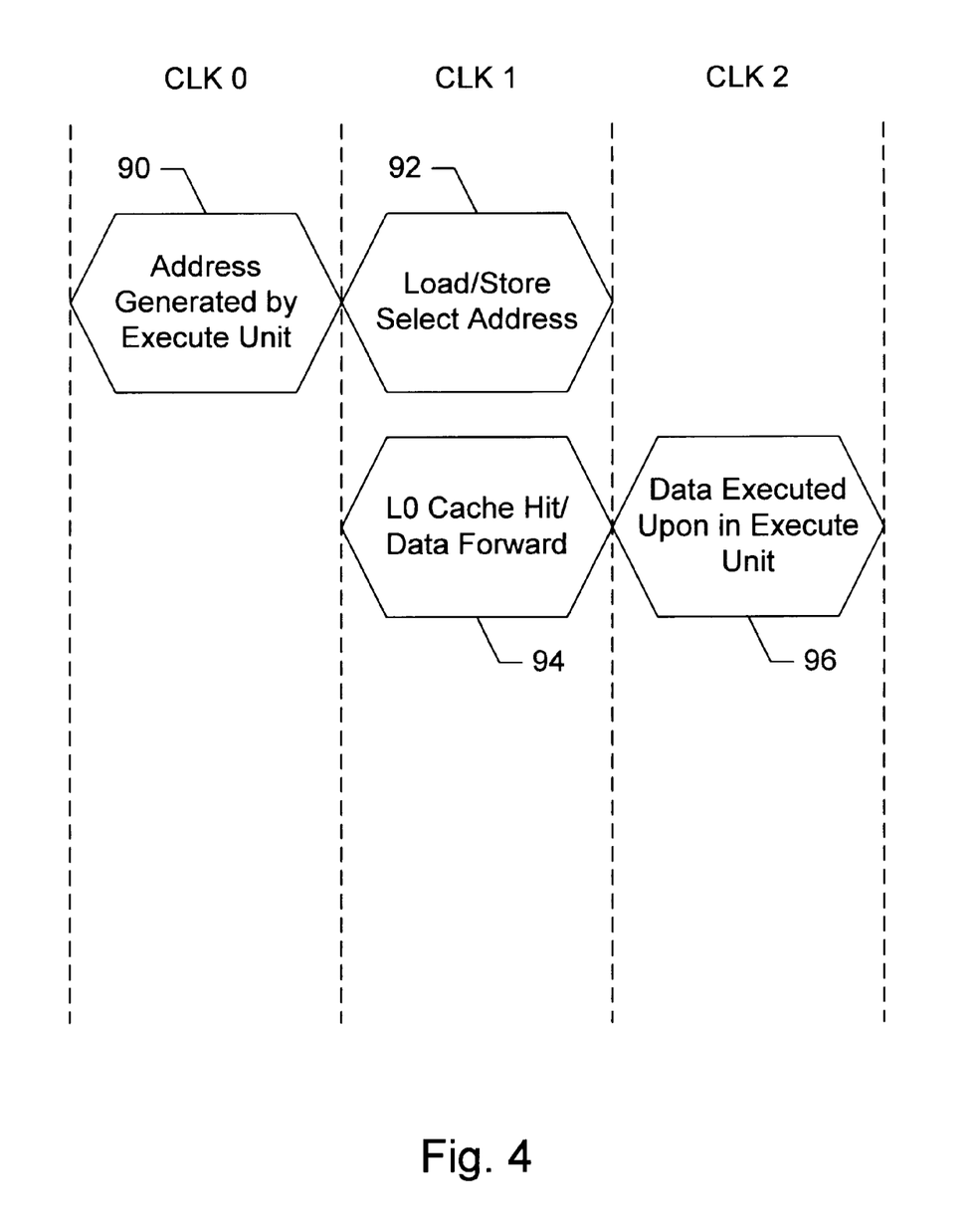
FIG. 4 is a timing diagram illustrating a hit in the L0 cache.

Turning next to FIG. 4, a timing diagram is shown illustrating a hit in L0 cache 26 according to one embodiment of microprocessor 10. Consecutive clock cycles CLK0, CLK1, and CLK2 are illustrated in FIG. 4. Each clock cycle is delimited by a pair of vertical dashed lines.

During clock cycle CLK0, an execute unit 18 generates an address by summing the address operands of an instruction (block 90). The execute unit 18 stores the generated address for conveyance to load/store unit 20 and L0 cache 26 during clock cycle CLK1. During clock cycle CLK1, load/store unit 20 selects the memory operation corresponding to the address being conveyed during clock cycle CLK1 for cache access (block 92). Since the address is being conveyed during clock cycle CLK1 and the corresponding memory operation is selected for cache access during clock cycle CLK1, L0 cache 26 is accessed. L0 cache 26 detects a hit for the address (block 94). L0 cache 26 forwards the data to the corresponding reservation station 17A–17B. The corresponding reservation station 17A–17B may select the instruction for execution, thereby allowing the corresponding execute unit 18 to operate, during clock cycle CLK2 (block 96), upon the data read from L0 cache 26 during clock cycle CLK1.

Figure 5:
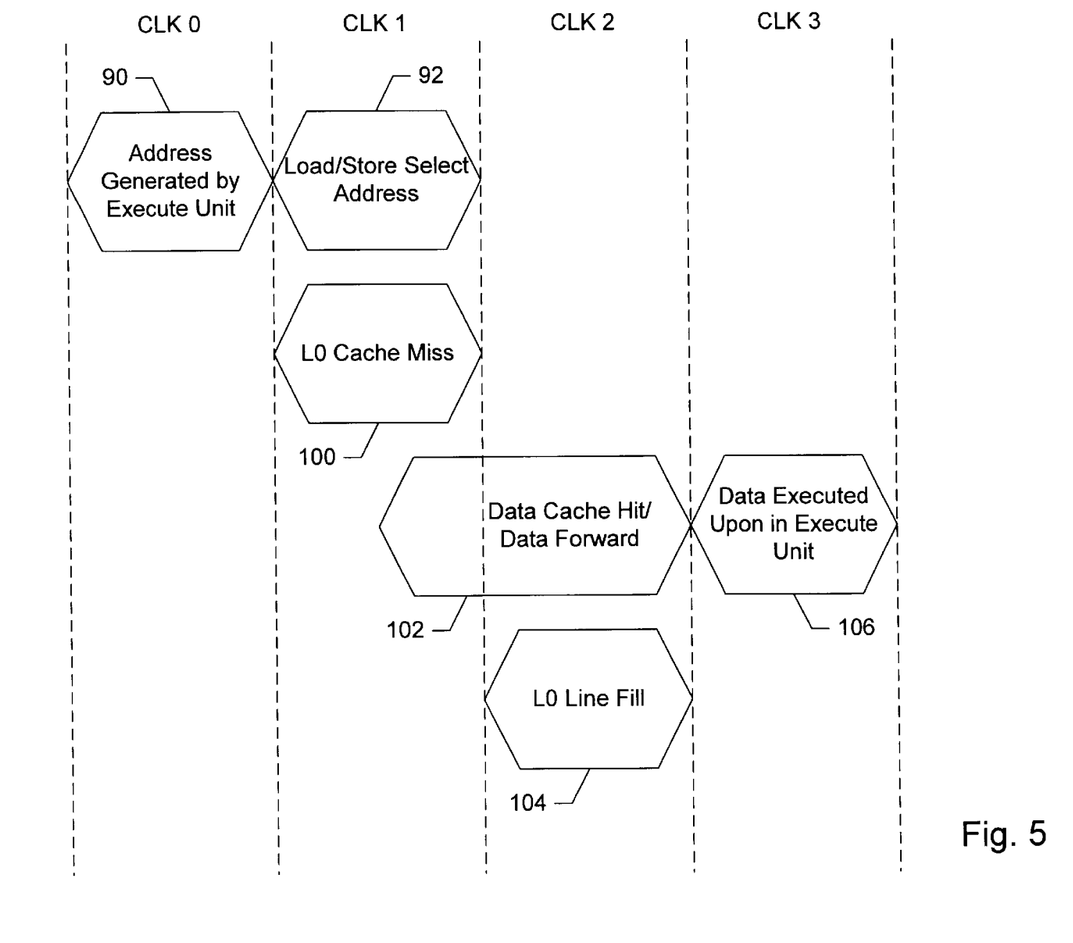
FIG. 5 is a timing diagram illustrating a hit in a data cache shown in FIG. 1.

Turning next to FIG. 5, a timing diagram is shown illustrating a miss in L0 cache 26 and a hit in data cache 14 according to one embodiment of microprocessor 10. Consecutive clock cycles CLK0, CLK1, CLK2, and CLK3 are illustrated in FIG. 5. Each clock cycle is delimited by a pair of vertical dashed lines.

As with FIG. 4, an execute unit 18A–18B generates an address by summing the address operands of an instruction during clock cycle CLK0 (block 90). The address is conveyed to load/store unit 20 (and L0 cache 26) during clock cycle CLK1. Additionally, load/store unit 20 selects the memory operation corresponding to the address to perform a cache access during clock cycle CLK1 (block 92). However, L0 cache 26 detects a miss during clock cycle CLK1 (block 100). Additionally, during the later portion of clock cycle CLK1, data cache 14 begins an access for the selected address (block 102).

Block 102 extends into clock cycle CLK2, during which a hit is detected in data cache 14. Data cache 14 forwards the requested datum to the corresponding reservation station 17A–17B. Additionally, data cache 14 forwards the cache line to L0 cache 26 in the form of a line fill operation (block 104).

During clock cycle CLK3, the data fetched from data cache 14 may be operated upon in the corresponding execute unit 18A–18B (block 106). Comparing FIGS. 4 and 5, data is available for execution one cycle later when a hit in data cache 14 is detected as opposed to a hit in L0 cache 26. Therefore, a performance increase may be achieved when memory operands hit in L0 cache 26.

Figure 6:
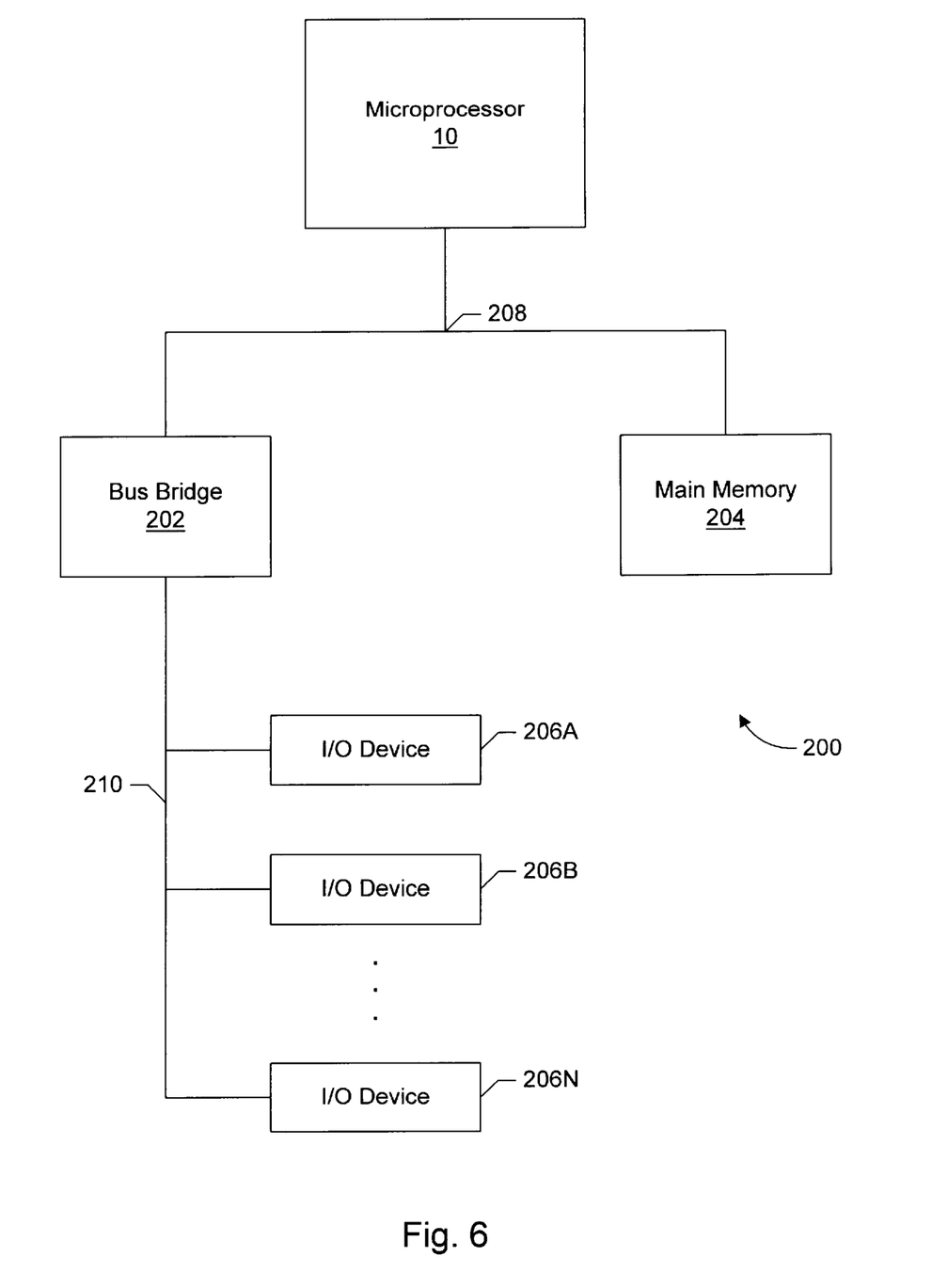
FIG. 6 is a block diagram of one embodiment of a computer system including the microprocessor shown in FIG. 1.

Turning now to FIG. 6, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/ output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 6 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10. It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

In accordance with the above disclosure, a microprocessor has been described which incorporates an L0 cache for reduced cache latency. Performance of the microprocessor may advantageously be increased due to the reduced cache latency.

Numerous variations and modifications will become apparent to those skilled in the art once the above disclosure is fully appreciated. It is intended that the following claims be interpreted to embrace all such variations and modifications.

What is claimed is:

1. A cache coupled to receive an access address, the cache comprising:
a fully associative tag storage comprising a plurality of tag storage locations; and
a tag control unit coupled to said tag storage, wherein said tag control unit is configured to logically divide said plurality of tag storage locations into a plurality of least recently used (LRU) groups, each of said plurality of LRU groups including at least two of said plurality of tag storage locations and each of said plurality of tag storage locations included in only one of said plurality or LRU groups, and wherein said tag control unit is configured to maintain independent LRU orderings for each of said plurality of LRU groups, and wherein said tag control unit is configured to select a first LRU group of said plurality of LRU groups and a first tag storage location for replacement responsive to said access address missing in said cache, said first tag storage location indicated to be least recently used within said first LRU group by a first LRU ordering corresponding to said first LRU group, and wherein said tag control unit comprises a pointer register, said pointer register configured to store a pointer indicating one of said plurality of LRU groups, wherein said tag control unit is configured to select said first LRU group responsive to said pointer indicating said first LRU group, and wherein said tag control unit is configured to use said pointer to select said plurality of LRU groups in a round-robin fashion for consecutive cache misses.

2. The cache as recited in claim 1 wherein each of said plurality of tag storage locations is configured to store a tag address and a corresponding LRU value, and wherein said tag control unit is configured to maintain said independent LRU orderings using said LRU value stored in each of said plurality of tag storage locations.

3. The cache as recited in claim 1 wherein said tag control unit is configured to update said first LRU ordering corresponding to said first LRU group of said plurality of LRU groups responsive to said access address hitting a first cache line corresponding to said first tag storage location, said first LRU group including said first tag storage location.

4. The cache as recited in claim 3 wherein said tag control unit is configured to update said first LRU ordering to indicate that said first tag storage location is most recently used among the tag storage locations included in said first LRU group responsive to said access address hitting said first ache line.

5. The cache as recited in claim 4 wherein said tag control unit is configured to leave other LRU orderings corresponding to each other one of said plurality of LRU groups unmodified in response to said access address hitting said first cache line.

6. The cache as recited in claim 1 wherein said cache is configured to fill a first cache line corresponding to said first tag storage location with data corresponding to said access address.

7. A cache coupled to receive an access address, the cache comprising:
a fully associative tag storage comprising a plurality of tag storage locations; and
a tag control unit coupled to said tag storage, wherein said tag control unit is configured to logically divide said plurality of tag storage locations into a plurality of least recently used (LRU) groups, each of said plurality of LRU groups including at least two of said plurality of tag storage locations and each of said plurality of tag storage locations included in only one of said plurality or LRU groups, and wherein said tag control unit is configured to maintain independent LRU orderings for each of said plurality of LRU groups, and wherein said tag control unit is configured to randomly select a first LRU group from said plurality of LRU groups responsive to said access address missing in said cache, and wherein said tag control unit is configured to select a first tag storage location for replacement responsive to said access address missing in said cache, said first tag storage location indicated to be least recently used within said first LRU group by a first LRU ordering corresponding to said first LRU group.

8. A method comprising:
logically dividing a plurality of tag storage locations within a fully associative tag storage of a cache into a plurality of least recently used (LRU) groups, wherein each of said plurality of LRU groups includes at least two of said plurality of tag storage locations and each of said plurality of tag storage locations is included in only one of said plurality of LRU groups;

independently maintaining LRU orderings on each of said plurality of LRU groups;

accessing said cache;

detecting a miss responsive to said accessing;

selecting a first LRU group of said plurality of LRU groups responsive to said detecting, wherein said selecting said first LRU group comprises:
maintaining a pointer capable of pointing to one of said plurality of LRU groups, wherein said maintaining comprises operating said pointer in a round-robin fashion in response to consecutive cache misses; and
selecting said one of said plurality of LRU groups indicated by said pointer;
selecting a first tag storage location of said plurality of tag storage locations to store fill data corresponding to said miss, said first tag storage location included in said first LRU group and indicated by a first LRU ordering corresponding to said first LRU group to be least recently used within said first LRU group.

9. The method as recited in claim 8 further comprising:

accessing said cache;

detecting a hit in a first cache line corresponding to said first tag storage location of said plurality of tag storage locations responsive to said accessing; and updating aid first LRU ordering of said first LRU group of said plurality of LRU groups to indicate that said first tag storage location is most recently used within said first LRU group responsive to said detecting, said first LRU group including said first tag storage location.

10. The method as recited in claim 9 further comprising leaving LRU orderings of each other one of said plurality of LRU groups unchanged in response to said accessing.

11. A method comprising:

logically dividing a plurality of tag storage locations within a fully associative tag storage of a cache into a plurality of least recently used (LRU) groups, wherein each of said plurality of LRU groups includes at least two of said plurality of tag storage locations and each of said plurality of tag storage locations is included in only one of said plurality of LRU groups;

independently maintaining LRU orderings on each of said plurality of LRU groups;

accessing said cache;

detecting a miss responsive to said accessing;

randomly selecting a first LRU group from said plurality of LRU groups responsive to said detecting; and selecting a first tag storage location of said plurality of tag storage locations to store fill data corresponding to said miss, said first tag storage location included in said first LRU group and indicated by a first LRU ordering corresponding to said first LRU group to be least recently used within said first LRU group.

12. A processor comprising:

a cache coupled to receive an access address, the cache comprising:
a fully associative tag storage comprising a plurality of tag storage locations; and
a tag control unit coupled to said tag storage, wherein said tag control unit is configured to logically divide said plurality of tag storage locations into a plurality of least recently used (LRU) groups, each of said plurality of LRU groups including at least two of said plurality of tag storage locations and each of said plurality of tag storage locations included in only one of said plurality or LRU groups, and wherein said tag control unit is configured to maintain independent LRU orderings for each of said plurality of LRU groups, and wherein said tag control unit is configured to select a first LRU group of said plurality of LRU groups and a first tag storage location for replacement responsive to said access address missing in said cache, said first tag storage location indicated to be least recently used within said first LRU group by a first LRU ordering corresponding to said first LRU group, and wherein said tag control unit comprises a pointer register, said pointer register configured to store a pointer indicating one of said plurality of LRU groups, wherein said tag control unit is configured to select said first LRU group responsive to said pointer indicating said first LRU group, and wherein said tag control unit is configured to use said pointer to select said plurality of LRU groups in a round-robin fashion for consecutive cache misses; and at least one execute unit coupled to provide said access address to said cache.

13. The processor as recited in claim 12 further comprising:

a load/store unit; and a second cache coupled to said load/store unit;

wherein said load/store unit is configured to select a memory operation to access said second cache concurrent with said execute unit providing said access address to said cache, and wherein said cache is configured to forward data in response to said access address only if said memory operation corresponds to said access address.

14. The processor as recited in claim 12 further comprising:

a load/store unit; and a second cache coupled to said load/store unit;

wherein said load/store unit is configured to select a memory operation to access said second cache concurrent with said execute unit providing said access address to said cache, and wherein said cache is configured to forward data in response to said access address only if said memory operation corresponds to said access address.

15. A processor comprising:

a cache coupled to receive an access address, the cache comprising:
a fully associative tag storage comprising a plurality of tag storage locations; and
a tag control unit coupled to said tag storage, wherein said tag control unit is configured to logically divide said plurality of tag storage locations into a plurality of least recently used (LRU) groups, each of said plurality of LRU groups including at least two of said plurality of tag storage locations and each of said plurality of tag storage locations included in only one of said plurality or LRU groups, and wherein said tag control unit is configured to maintain independent LRU orderings for each of said plurality of LRU groups, and wherein said tag control unit is configured to randomly select a first LRU group from said plurality of LRU groups responsive to said access address missing in said cache, and wherein said tag control unit is configured to select a first tag storage location for replacement responsive to said access address missing in said cache, said first tag storage location indicated to be least recently used within said first LRU group by a first LRU ordering corresponding to said first LRU group; and at least one execute unit coupled to provide an access address to said cache.

* * * * *

UNITED STATES PATENT AND TRADEMARK OFFICE
CERTIFICATE OF CORRECTION

PATENT NO. : 6,161,167

DATED : December 12, 2000

INVENTOR(S) : David B. Witt

It is certified that error appears in the above-identified patent and that said Letters Patent is hereby corrected as shown below:

In the Claims:

Claim 4, col. 16, line 30, please delete "ache" and insert --cache-- in place thereof.

Signed and Sealed this

Twenty-ninth Day of May, 2001

Attest:

NICHOLAS P. GODICI

Attesting Officer    Acting Director of the United States Patent and Trademark Office